United States Patent Office 2,891,990
Patented June 23, 1959

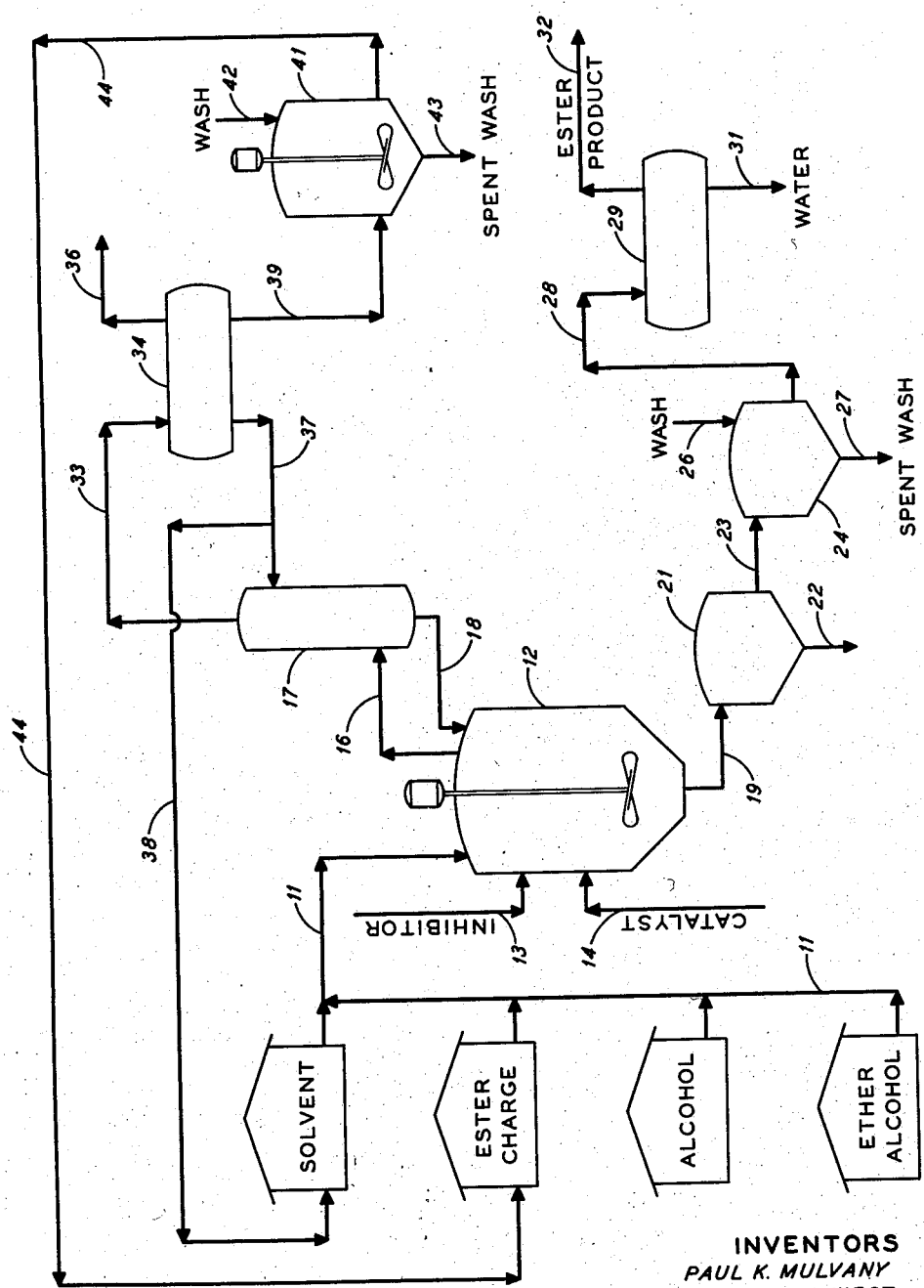

2,891,990
PREPARATION OF HIGHER ALKYL METHACRYLATES

Paul K. Mulvany, Richmond, and William W. West and Alfred Goldschmidt, El Cerrito, Calif., assignors to California Research Corporation, San Francisco, Calif., a corporation of Delaware Application September 28, 1956, Serial No. 612,814

2 Claims. (Cl. 260—486)

This invention relates to the preparation of unsaturated esters. More particularly, the invention is concerned with a superior new process for preparing higher aliphatic esters of α,β-unsaturated monocarboxylic acids.

Higher aliphatic esters of α,β-unsaturated monocarboxylic acids are useful in the production of polymeric additives for lubricants and fuels where the solubility of the polymeric additives in oil is a prerequisite. Such esters may be prepared by direct esterification of an α,β-unsaturated monocarboxylic acid with an aliphatic alcohol or ether alcohol. It has been preferred, however, to prepare the higher aliphatic esters of this type by a so-called "ester interchange" reaction, or alcoholysis of a lower alkyl ester of the α,β-unsaturated monocarboxylic acid with a higher aliphatic alcohol or ether alcohol. In this reaction, it is customary to employ an acidic esterification catalyst such as sulfuric acid or p-toluene sulfonic acid to promote the "ester interchange" or alcoholysis in combination with a polymerization inhibitor to control polymerization of the unsaturated esters.

The preparation of higher aliphatic esters of α,β-unsaturated monocarboxylic acids by "ester interchange" or alcoholysis as described has been subject to several serious disadvantages. Careful control of reaction conditions has been necessary to avoid excessive formation of undesirable polymers and to maintain satisfactory yields of the higher aliphatic esters. Particularly intractable emulsions are also encountered in the products of these preparations. Such emulsions are major problems, since they require time and expensive treatment to separate and result in further reduction in the yield of the desired unsaturated esters.

Modifications of the reactor equipment and the use of additional steps in the "ester interchange" or alcoholysis reaction such as the introduction of oxygen-containing gases have not been a completely satisfactory solution to the above problems. Such methods are not entirely effective in the prevention of emulsions which are difficult to resolve and the inhibition of undesirable polymerization, both of which contribute to an undesirable reduction in yield of the higher aliphatic ester, as already mentioned. Alterations of equipment and extra process steps also create additional expenses which make the higher aliphatic esters more costly to produce. Furthermore, work hazards are often greatly increased with such modifications and additional steps, as, for example, the use of oxygen-containing gases in the reaction, since there is great danger of violent explosions due to the presence of free oxygen.

We have now found that higher aliphatic esters of α,β-unsaturated monocarboxylic acids suitable for the production of polymeric additives can be readily prepared in excellent yields without the formation of excessive polymer and/or emulsions and the need for extra treatment by an unusually effective new process which comprises reacting a lower alkyl ester of an α,β-unsaturated monocarboxylic acid with a member of the group consisting of higher aliphatic alcohols and aliphatic ether alcohols in the presence of a basic esterification catalyst and a polymerization inhibitor, the molar equivalent ratio of polymerization inhibitor to catalyst being greater than 1.

The process of preparing higher aliphatic esters of α,β-unsaturated monocarboxylic acids according to this invention is remarkably straightforward and easy to control. Excessive polymerization of the reactants is avoided and the yields of product are good. Probably the most remarkable advantage of the process according to the present invention, however, lies in the fact that very little product is lost in the form of intractable emulsions which are difficult to resolve. The process is carried out in conventional equipment, and all of the foregoing benefits are obtained without extra expense of modifications and additional steps, as, for example, the passing of a free oxygen-containing gas into the reaction mixture.

Since the preparation of the higher aliphatic esters by the process according to this invention does not rely on the presence of free oxygen to inhibit the formation of excessive polymer and unbreakable emulsions, it is much safer to carry out without the hazard of violent explosions.

The lower alkyl ester of an α,β-unsaturated monocarboxylic acid employed as a starting material in the process according to this invention is ordinarily one in which the alkyl group contains from 1 to 4 carbon atoms. More suitably, the ester is one having the general formula

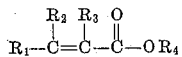

where $R_1$, $R_2$ and $R_3$, which can be the same as or different from one another, are selected from the group consisting of hydrogen atoms and alkyl groups of from 1 to 4 carbon atoms and $R_4$ is an alkyl group of from 1 to 4 carbon atoms. Representative esters of this type, any one or more of which can be employed in the reaction, are the methyl, ethyl, propyl, isopropyl, butyl, sec.-butyl and tert.-butyl esters of acids such as acrylic, methacrylic, crotonic, tiglic, angelic, α-ethylacrylic, α-methylcrotonic, α-ethylcrotonic, β-ethylcrotonic, α-butylcrotonic, hydrosorbic, α-ethylhydrosorbic and α-propylhydrosorbic acids and the like. A more preferred group of esters for use in the process according to the present invention comprises those of the type indicated by the above structural formula, which are esters of acids containing a total of from about 3 to 8 carbon atoms in the molecule as represented by all except the last-named of the above-listed acids. A still more preferred group of esters is made up of the methyl and ethyl esters of acrylic and methacrylic acids with methyl methacrylate being the most preferred for present purposes because of its availability and effectiveness in the process according to the invention.

Suitable higher aliphatic alcohols for the process of the invention are those which contain a higher number of carbon atoms than the alkyl group of the lower alkyl ester of α,β-unsaturated monocarboxylic acid as described above.

Such alcohols include both monohydric and polyhydric types, for example, ethanol, ethylene glycol, propanol, glycerol, butanol, pentaerythritol, dodecanol, 1,2-octadecanediol, and similar alcohols. Ordinarily alcohols containing up to 40 carbon atoms are satisfactory. Mixtures of aliphatic alcohols are quite suitable in the process for the provision of mixed aliphatic esters which in turn, are used in preparing polymers having mixed aliphatic groups of different types and chain lengths.

For present purposes aliphatic monohydric alcohols containing at least 5 carbon atoms are preferred. Monohydric alcohols having from 8 to 30 carbon atoms are still more preferred for their effectiveness in the reaction according to the invention and also for the particular suitability of their esters of α,β-unsaturated monocarboxylic acids in the production of polymeric additives for lubricants and fuels.

The higher aliphatic monohydric alcohols may be primary, secondary or tertiary alcohols. However, for present purposes, primary and secondary alcohols, and particularly the primary alcohols, are preferred as being more suitable to the process of the invention. The alcohols are preferably branched or straight-chain in nature, although cycloaliphatic groups are not precluded.

Illustrative aliphatic monohydric alcohols of the foregoing type include n-pentanol, 2-pentanol, cyclopentanol, n-hexanol, cyclohexanol, 2-ethylhexanol, dodecanol, 1-pentadecanol, octadecanol, 5-ethyldocosanol, triacontanol and other similar alcohols of at least five carbon atoms. Particularly preferred are the straight-chain and branched-chain primary alcohols containing from 10 to 20 carbon atoms in their alkyl groups.

The aliphatic ether alcohols which are employed in the process according to this invention are alkyl ethers of aliphatic polyhydric alcohols such as the glycols, polyalkylene glycols and other polyhydric alcohols, including glycerol, pentaerythritol and the like. Particularly suitable are the glycol monoalkyl ethers and polyalkylene glycol monoalkyl ethers having the general structural formula $$HO-(-R_5-O)_n-R_6$$

where the $R_5$'s are 1,2-alkylene radicals of 2 to 7 carbon atoms each, $n$ is an integer of at least 1 and $R_6$ is preferably an alkyl group of from 1 to 18 carbon atoms. However, aryl, arylaliphatic and cycloaliphatic groups such as phenyl, benzyl and cyclohexyl are not precluded. For present purposes the more preferred ether alcohols are the poly-1,2-alkylene glycol monoalkyl ethers of the type derived from polymerization of ethylene oxide or 1,2-propylene oxide or mixtures thereof in which aliphatic monohydric alcohols of from 1 to 18 carbon atoms are used as initiators, said ether alcohols having molecular weights between about 106 and 2000.

The following polyalkylene glycol monoalkyl ethers are illustrative of the type described above:

$HO-(CH_2-CH_2-O)_3-C_{12}H_{25}$
$HO-(CH_2-CH_2-O)_7-CH_3$
$HO-(CH_2-CH_2-O)_9-C_{12}H_{25}$
$HO-[CH(CH_3)CH_2-O]C_{13}H_{27}$
$HO-[CH(CH_3)CH_2-O]_7-C_{12}H_{25}$
$HO-[CH_2-CH_2-O-CH(CH_3)CH_2-O]_5-CH_3$
$HO-(CH_2-CH_2-O)_9CH_3$
$HO-(CH_2-CH_2-O)_{13}-C_8H_{17}$
$HO-(CH_2-CH_2-O)_{13}-C_{12}H_{25}$
$HO-(CH_2-CH_2-O)_{13}-C_{18}H_{37}$
$HO[CH_2-(CH_3)CHO]_3S_{12}H_{25}$
$HO(CH_2-CH_2-CH_2O)_4C_{12}H_{25}$
$HO(C_5H_{10}O)_3C_{12}H_{25}$

Polyethylene glycol monododecyl ether mixtures having average molecular weights of 200, 400, 1000, 1540, 2000 or 10,000.

Poly-1,2-propylene glycol monododecyl ether mixtures having average molecular weights of 425, 1025 or 10,000.

The improved new process of the present invention is particularly adaptable to the use of aliphatic monohydric alcohols and for that reason those materials as described above are presently preferred.

Basic esterification catalysts suitable for the purposes of the present invention, as their name indicates, are esterification catalysts having the properties of a base. Preferably, such catalysts are alcoholates of a metal such as sodium, potassium, lithium, calcium, magnesium or aluminum. Lower alcoholates of sodium or potassium such as sodium methylate or sodium methoxide, as it is commonly referred to, potassium ethylate and other similar alcoholates containing not more than 7 carbon atoms, and particularly 2 or less, are still more preferred.

Of the foregoing basic esterification catalysts, sodium methylate is most preferred for availability and effectiveness in the process.

The polymerization inhibitor employed in the process according to this invention is also known, perhaps more commonly, as an oxidation inhibitor. Suitable polymerization inhibitors are the polyhydroxy aromatic and arylamine oxidation inhibitors such as hydroquinone, tert.-butyl catechol, monomethyl ether of hydroquinone, p-hydroxy diphenylamine and the like. Presently preferred are the phenolic or polyhydroxy aromatic type inhibitors such as hydroquinone and tert.-butyl catechol with hydroquinone being the most preferred.

In the reaction according to the process of this invention, the lower alkyl ester of the $\alpha,\beta$-unsaturated monocarboxylic acid is desirably employed in a stoichiometric molar excess over the amount of higher aliphatic alcohol or aliphatic ether alcohol present. Preferably, the molar ratio of ester to aliphatic monohydric alcohol is within the range of from about 3:1 to about 12:1. In the case of polyhydric alcohols the amount of ester is increased in direct proportion to the number of hydroxyl groups. For present purposes, molar ratios of lower alkyl ester to aliphatic monohydric alcohol of about 5:1 are most preferred, since they provide optimum conversions of lower alkyl ester to the higher aliphatic ester of $\alpha,\beta$-unsaturated monocarboxylic acid. Excess lower alkyl ester from the reaction may be recovered and recycled for further use in the reaction.

The basic esterification catalyst is present in the reaction in an amount sufficient to promote the alcoholysis of the lower alkyl ester of the $\alpha,\beta$-unsaturated monocarboxylic acid with the higher aliphatic alcohol or the aliphatic ether alcohol. Preferably, from about 10 to about 50 mole percent of the basic esterification catalyst is used on the basis of the higher aliphatic monohydric alcohol or aliphatic ether alcohol. In the case of polyhydric alcohols the amount of catalyst is increased in direct proportion to the number of hydroxyl groups. For present purposes, about 35 mole percent is the most preferred for consistently high conversions, particularly in the case of sodium methylate catalyst and aliphatic monohydric alcohols of 10 to 20 carbon atoms.

In accordance with the process of this invention, it is essential that the polymerization inhibitor be employed in a molar equivalent excess over the amount of basic esterification catalyst. That is to say, the molar equivalent ratio of the polymerization inhibitor to the basic esterification catalyst must be greater than 1. The terms "molar" and "equivalent" are used here with respect to the catalyst and the polymerization inhibitor in their commonly accepted sense, "molar" meaning the molecular weight of the compound expressed in grams and "equivalent" meaning the molecular weight of the compound divided by the valency of its principal radicals. For example, sodium methylate has a molecular weight of, roughly, 55 and the valence of its principal radical is 1. Thus, a "molar equivalent" of sodium methylate is 55 grams. Hydroquinone, on the other hand, has a valence of 2, due to its two hydroxyl radicals, and a molecular weight of approximately 110. Therefore, dividing 110 by 2 gives a "molar equivalent" of hydroquinone as 55 grams, coinciding in this example with the sodium methylate catalyst. Accordingly, any weight excess of hydroquinone inhibitor over sodium methylate catalyst is a molar equivalent excess and will give a molar equivalent ratio of inhibitor to catalyst greater than 1.

When the molar equivalent ratio of polymerization catalyst to basic esterification catalyst is less than 1, unsatisfactory results are obtained. Undesirable polymerization of the lower alkyl ester reactant occurs and intractable emulsions are formed which are difficult to resolve. Thus, a loss of the desired higher aliphatic ester product is caused and there is a consequent lowering in yield. The discovery of this critical factor constitutes an important aspect of the superior new process of this invention, since the combination of basic esterification catalyst and polymerization inhibitor in the preparation of higher aliphatic esters of $\alpha,\beta$-unsaturated monocarboxylic acids by the alcoholysis of lower alkyl esters of the acids with higher aliphatic alcohols has apparently not been contemplated prior to the present discovery.

In the process, it is preferred that the molar equivalent ratio of polymerization inhibitor to basic esterification catalyst be within the range of from about 1.2:1 to about 2.0:1. Such ratios have been found to be particularly effective when the more suitable hydroquinone polymerization inhibitor and sodium methylate catalyst are employed, as previously mentioned. The most preferred ratio of molar equivalents of the polymerization inhibitor to the catalyst for present purposes is about 1.4:1. Such ratios are generally satisfactory in the elimination of undesirable polymerization and intractable emulsions, while at the same time conserving the amount of polymerization inhibitor to be used in the reaction.

The reaction according to this invention may be carried out at any temperature at which alcoholysis occurs, preferably not exceeding 265° F., since undesirable polymerization may be thermally initiated at abnormally high temperatures. Reaction temperatures in the range from about 190° F. to about 250° F. are still more preferred, with temperatures of from about 210 to about 215° F. being most satisfactory from the standpoint of optimum conversions and the suppression of undesirable side reactions.

The process according to the invention may be carried out at any suitable pressure, whether atmospheric, superatmospheric or subatmospheric. Pressures less than atmospheric are generally preferred to permit proper control of reaction temperatures within the limits described above. Vacuums equivalent to pressures of from about 300 to about 700 mm. of mercury are particularly suitable, although pressures as low as about 50 mm. mercury may be conveniently utilized in the reaction, especially in the final stages of the reaction where it is desirable to strip or distill off excess lower alkyl ester of the $\alpha,\beta$-unsaturated monocarboxylic acid.

The reaction is carried out over a period of time sufficient to insure the desired conversion of lower alkyl ester of $\alpha,\beta$-unsaturated monocarboxylic acid to the higher aliphatic ester. Ordinarily, from about 4 to about 12 hours' reaction time is sufficient for this purpose. Reaction times of from about 8 to 10 hours are presently preferred for consistently high conversions.

The reaction product obtained in the process of the invention may be purified according to conventional procedures to give the desired higher aliphatic ester of $\alpha,\beta$-unsaturated monocarboxylic acid. Excess lower alkyl ester of the $\alpha,\beta$-unsaturated monocarboxylic acid is conveniently stripped off by vacuum distillation. The stripped crude product thus obtained may be washed with an alkaline solution such as an aqueous solution of sodium hydroxide or sodium carbonate to neutralize the polymerization inhibitor if desired. Following this alkaline wash, an aqueous salt solution of, for example, sodium chloride or sodium sulfate may be used to salt out neutralized polymerization inhibitor and other impurities. Ordinarily, it is sufficient for these purposes to wash the product twice with approximately 0.5 its volume of 2 to 5 percent sodium hydroxide solution following which the impurities are salted out by treatment with approximately 0.5 its volume of 10 percent sodium chloride solution.

A significant advantage of the present invention lies in the ease and efficiency with which the crude products may be purified. Simple purification procedures of the foregoing type are readily carried out and are particularly adaptable to the process because of the resistance of its products to the formation of difficultly separable emulsions.

Solvents may be used in the process of the invention where they are indicated to facilitate the handling of reactants and maintenance of reaction conditions. Any non-reacting solvent of the desired physical properties is satisfactory. Hydrocarbon solvents, such as toluene or xylene are particularly suitable for both reaction and purification steps.

During the process, a portion of the excess of the lower alkyl ester of the $\alpha,\beta$-unsaturated monocarboxylic acid is distilled off in the form of an azeotropic mixture with the lower aliphatic alcohol by-product of the alcoholysis reaction. This lower alkyl ester of the $\alpha,\beta$-unsaturated monocarboxylic acid is conveniently recovered by washing the azeotropic mixture with an aqueous salt solution, for example, brine, to separate out the more water-miscible lower aliphatic alcohol. The lower alkyl ester along with the remaining excess lower alkyl ester distilled off in the final stages of the process may be reused or recycled in the process. Ordinarily, it is desirable to add sufficient polymerization inhibitor to the lower alkyl ester at this point to prevent polymerization of the unsaturated ester.

The following examples are offered in further illustration of the invention. Unless otherwise specified, the proportions are given on a weight basis.

EXAMPLE I

To a reaction vessel equipped with agitator and reflux column is charged 5 moles of methylmethacrylate (500 gm.) followed by 0.48 molar equivalent of hydroquinone (26.5 gm.). The hydroquinone is dissolved by stirring at room temperature. 1 mole of tridecyl alcohol (200 gm.) is then charged. Following this, 0.35 mole equivalent of solid sodium methylate (18.9 gm.) is added. The reaction mixture is heated to reflux with overhead distillation at a rate sufficient to maintain a reflux temperature of not over 170° F. During this reflux period, the reaction temperature rises steadily. When the temperature reaches 215° F., sufficient vacuum is applied to maintain a 215° F. maximum reaction temperature. The reaction is complete in 8 hours as indicated by a drop in the rate of methanol evolution.

Excess methylmethacrylate is stripped by distillation from the reaction mixture by heating to 220° F. at 50 mm. mercury pressure. The crude product thus obtained is then cooled and transferred to a separatory vessel. The crude product is washed once with 0.5 volume of 5% aqueous sodium hydroxide solution, followed by another 0.5 volume of 2% aqueous sodium hydroxide solution. The washed crude product is heated to 120° F. to assist in phase separation. 0.5 volume of 10% sodium chloride solution is then added to salt out impurities. The upper phase is then recovered and dried over calcium chloride. The yield of tridecyl methacrylate thus obtained is approximately 95% of theoretical, based on the tridecyl alcohol charged to the reaction.

The overhead products taken off by distillation during the reaction are shaken with an equal volume of 10% brine. This separates the overhead products into two phases. The top phase is methylmethacrylate and the bottom phase brine and methanol. The methylmethacrylate is separated and combined with the excess methylmethacrylate recovered by stripping from the crude product for reuse in the process.

The following table summarizes the pertinent details of other additional examples illustrative of the process of this invention. The examples from which the data are taken follow the same general procedure as outlined in the foregoing example. It will be noted from the table that examples using acidic esterification catalysts are included for comparison. Representative higher aliphatic monohydric alcohols and aliphatic ether alcohols are also shown in the examples.

Table

| Example No. | Mole Ratio, Ester:Alcohol | Percent Catalyst Based on Alcohol | Molar Equiv. Ratio of Inhibitor:Catalyst | Temp., °F. | Alcohol or Polyglycol | Time, Hrs.:Min. | Yield Percent Based on Alcohol | Comments |
|---|---|---|---|---|---|---|---|---|
| II | 4.9:1.0 | 0.7 wt. percent H₂SO₄ | 12 HQ:1.0 H₂SO₄ | 215 | (¹) | 12:00 | 68.0 | Low yields because of emulsions. |
| III | 4.7:1.0 | 13.2 mole percent NaOCH₃ | 4.1 HQ:1.0 NaOCH₃ | 230 | (¹) | 8:00 | 81.7 | No workup difficulty. |
| IV | 5.0:1.0 | 20.1 mole percent NaOCH₃ | 1.0 HQ:1.0 NaOCH₃ | 210 | (²) | 4:00 | 82.0 | |
| V | 4.85:1.0 | 15 mole percent | 1.0 PDA:1.0 NaOCH₃ | 210 | (²) | 3:00 | None | Polymerized. |
| VI | 3.0:1.0 | 4.6 mole percent NaOCH₃ | 1.6 HQ:1.0 NaOCH₃ | 245 | (³) | 2:20 | 94 | No workup difficulty. |
| VII | 3.0:1.0 | 2.7 mole percent H₂SO₄ | 3.0 HQ:1.0 H₂SO₄ | 260 | (⁴) | 3:00 | None | Bad emulsion, no product isolated. |
| VIII | 5.0:1.0 | 34.7 mole percent NaOCH₃ | 1.25 HQ:1.0 NaOCH₃ | 215 | (³) | 7:00 | 93 | No workup difficulty. |
| IX | 3.0:1.0 | 9.3 mole percent NaOCH₃ | 1.0 HQ:2.5 NaOCH₃ | 215 | (³) | 2:15 | None | Polymerized. |
| X | 5.0:1.0 | 35.0 mole percent NaOCH₃ | 1.25 HQ:1.0 NaOCH₃ | 213 | (⁴) | 9:00 | 95 | No workup difficulty. |
| XI | 5.0:1.0 | 22.7 mole percent NaOCH₃ | 1.20 HQ:1.0 NaOCH₃ | 215 | (⁵) | 6:00 | 91 | Do. |
| XII | 5.0:1.0 | 36.0 mole percent NaOCH₃ | 1.4 HQ:1.0 NaOCH₃ | 214 | (⁶) | 7:00 | 96 | Do. |
| XIII | 10.0:1.0 | 35.0 mole percent NaOCH₃ | 1.4 HQ:1.0 NaOCH₃ | 217 | (⁷) | 7:00 | 98 | Do. |

¹ A capped polyglycol ether containing both polyethylene and polypropylene glycol in an equal number of units. Molecular wt.=354.
² A lauryl ether capped polyethylene glycol having a molecular wt.=591.
³ Oxo-tridecyl alcohol, a branched-chain primary C₁₃ alcohol obtained by the Oxo Process from triisobutylene polymer.
⁴ Mixed alcohols consisting of approximately 60 mole percent Oxo-tridecyl alcohol and 40 mole percent tallow alcohols (see below).
⁵ Tallow alcohol, a mixture of straight-chain primary alcohols consisting of approximately 20 mole percent cetyl alcohol and 80 mole percent stearyl alcohol obtained by the hydrogenolysis of tallow.
⁶ Decyl alcohol.
⁷ Ethylene glycol.
Ester=Methyl Methacrylate. PDA=Phenylene Diamine. HQ=Hydroquinone.

From the data provided by the above examples, it can be seen that the superior new process for preparing higher aliphatic esters of α,β-unsaturated monocarboxylic acids according to the present invention gives excellent yields and avoids the problems of excessive polymerization and intractable emulsions heretofore encountered in such reactions. Although the acidic catalysts give low yields and emulsions which are difficult to separate, the basic esterification catalyst employed in critical ratio with the polymerization inhibitor according to this invention gives unexpectedly good yields and no workup difficulty due to emulsions.

The superior new process for preparing higher aliphatic esters of α,β-unsaturated monocarboxylic acids in accordance with this invention may also be illustrated with reference to the simplified schematic flow diagram of the accompanying drawing. Briefly summarized, the flow diagram shows a novel system wherein a lower alkyl ester of an α,β-unsaturated monocarboxylic acid is reacted with a higher aliphatic monohydric alcohol or aliphatic ether alcohol in the presence of a basic esterification catalyst and a polymerization inhibitor in critical ratio. In this system the desirable, higher aliphatic esters of the α,β-unsaturated monocarboxylic acids are obtained in excellent yields without the formation of excessive polymer by-products or difficult to handle emulsions. As illustrated, the reaction is adaptable to either "batch" process techniques or "continuous" process methods in which reactants are charged and the products of the reaction withdrawn continuously. In either type of operation, the separation and purification steps in working up the crude product are essentially the same as shown by the flow diagram, including recovery and reuse or recycle of unreacted materials.

In a typical example of the process of this invention, referring to the flow diagram, the lower alkyl ester of α,β-unsaturated monocarboxylic acid, for example, methyl methacrylate, is withdrawn from the ester charge supply and introduced via line 11 into reactor 12, which is equipped with stirrer. Polymerization inhibitor such as hydroquinone is charged through 13 to the reactor. The contents of the reactor are agitated to dissolve the inhibitor. Following this, a higher aliphatic monohydric alcohol or aliphatic ether alcohol is introduced into the reactor via line 11 from the alcohol supply. For the purpose of this example, a mixture of dodecyl, tridecyl and octadecyl alcohols is employed. A solvent such as toluene may be added from solvent storage through line 11, if desired, to dilute the reaction mixture in reactor 12. However, in the present example, it is not necessary. A basic esterification catalyst such as sodium methylate is then charged to reactor 12 via line 14. The quantities of catalyst, polymerization inhibitor, higher aliphatic alcohol and lower alkyl ester in this example are such that the ratio of mole equivalents of hydroquinone to sodium methylate is 1.4:1, the molar ratio of methyl methacrylate to aliphatic alcohol (dodecanol, tridecanol and octadecanol) is 5:1 and the molar ratio of aliphatic alcohol to sodium methylate catalyst is 1:0.35.

Proceeding from the charging step outlined above, the temperature of the contents of the reactor is raised to a point where hydrolysis occurs, as indicated by the evolution of lower alkyl alcohol, that is, methanol in this illustration, from the reaction mixture. For the purpose of the present example, sufficiently low pressure is maintained in reactor 12 to provide for a 215° F. maximum reaction temperature. Lower boiling products of the hydrolysis reaction such as methanol are withdrawn overhead via line 16 to reflux column 17 from which reflux is returned via line 18 to the reactor. In this example a portion of the methyl methacrylate is also withdrawn overhead through line 16 to reflux column 17 and returned through line 18 to the reaction. The reaction is complete in about 8 hours. This fact is indicated by the lower alkyl alcohol, methanol, no longer being evolved.

When the reaction is complete, excess lower alkyl ester which remains unreacted in the reaction mixture is removed by distillation at reduced pressure. In the present example, illustrative of a batch-type operation, the methyl methacrylate is stripped from the reaction mixture in reactor 12 by distillation at a temperature of about 220° F. and a pressure equal to about 50 mm. of mercury and withdrawn overhead from the reactor via line 16. In a continuous operation the reaction mixture may be withdrawn continuously from the reactor to a stripper. There unreacted lower alkyl ester is distilled off and recycled to the ester charge supply for further use, leaving the crude higher aliphatic unsaturated ester product of the stripped reaction mixture ready for purification.

In the purification step the crude reaction product is taken through line 19 to separator 21. Insoluble materials and other impurities which are separated out are withdrawn via outlet 22. The crude product is then conveyed via line 23 to treating vessel 24. The purification treatment in this example comprises a series of washes introduced through line 26 consisting of 0.5 volume of 5% sodium hydroxide solution followed by 0.5 volume of 2% sodium hydroxide solution and finally by 1 volume of 10% sodium chloride solution. Spent washes are withdrawn via outlet 27. The foregoing treating and settling steps in the purification of the crude ester product are readily carried out in the process according to the present invention because there is little or no tendency to form difficultly separable emulsions. After the washing operations in treating vessel 24, the ester product is conveyed through line 28 to drier 29. From drier 29 water is withdrawn via outlet 31 and the final ester product of the reaction, in the present example a mixture of dodecyl methacrylate, tridecyl methacrylate and octadecyl methacrylate, is withdrawn through line 32.

The materials distilled overhead from reactor 12, as mentioned previously, are withdrawn via line 16 to refluxing column 17. As already indicated, in this example a suitable reflux is returned to the reaction via line 18 comprising certain condensed materials from the overhead including unreacted methyl methacrylate. From refluxing column 17 a mixture of low boiling or uncondensed materials is taken off via line 33 to condenser separator 34. In condenser separator 34, a vacuum may be applied, if desired, via line 36. Any solvent present in the overhead distillation products of the reaction may be returned to the refluxing column via line 37 or to solvent storage through line 38. However, as previously mentioned, no solvent is necessary in the present example.

Unreacted lower alkyl ester of the $\alpha,\beta$-unsaturated monocarboxylic acid is withdrawn from condenser separator 34 via line 39. It is usually in the form of an azeotropic mixture with the lower alkyl alcohol produced by hydrolysis during the reaction, in this example, an azeotropic mixture of methanol and methyl methacrylate. The mixture is taken via line 39 to washing vessel 41 which is equipped with stirrer. In washing vessel 41 the azeotropic mixture is washed with a 10% brine solution introduced through line 42. Following agitation, two phases separate. The bottom phase, consisting of brine and lower alkyl alcohol, in this example methanol, is taken off through line 43. The top phase consisting of the excess unreacted lower alkyl ester of $\alpha,\beta$-unsaturated monocarboxylic acid, such as the methyl methacrylate in the present illustration, is taken off via line 44 and recycled or returned to ester charge storage for reuse in the process.

We claim:

1. A process for preparing higher alkyl methacrylates which comprises reacting methyl methacrylate with a higher alkanol of from 8 to 30 carbon atoms in the presence of sodium methylate esterification catalyst and hydroquinone polymerization inhibitor, the molar equivalent ratio of polymerization inhibitor to catalyst being within the range of from about 1.2:1 to about 2.0:1 and said sodium methylate esterification catalyst being present in an amount of from about 10 to about 50 mole percent based on the amount of higher alkanol.

2. A process for preparing higher alkyl methacrylates which comprises reacting methyl methacrylate with tridecyl alcohol in the presence of sodium methylate basic esterification catalyst and hydroquinone polymerization inhibitor, the molar equivalent ratio of polymerization inhibitor to catalyst being about 1.4:1 and said catalyst being present in an amount of about 35 mole percent based on the tridecyl alcohol.

References Cited in the file of this patent

UNITED STATES PATENTS

| | | |
|---|---|---|
| 2,129,667 | Barrett et al. | Sept. 13, 1938 |
| 2,129,694 | Izard | Sept. 13, 1938 |
| 2,129,722 | Woodhouse | Sept. 13, 1938 |
| 2,396,434 | Rehberg et al. | Mar. 12, 1946 |
| 2,618,652 | Hollyday | Nov. 18, 1952 |

OTHER REFERENCES

Riddle: "Monomeric Acrylic Esters" (1954), pp. 186–8.